United States Patent Office 2,726,160
Patented Dec. 6, 1955

2,726,160
BORON NITRIDE DISPERSION

Herbert F. G. Ueltz, Worcester, Mass., assignor to Norton Company, Worcester, Mass., a corporation of Massachusetts No Drawing. Application November 12, 1952,
Serial No. 320,136

3 Claims. (Cl. 106—38.22)

The invention relates to antisticking agents for molds, particularly for glass makers' and metal founders' molds, otherwise known as mold lubricators or mold release agents, and the invention contemplates a dispersion of boron nitride as a composition of matter for such purpose.

One object of the invention is to provide a novel composition of matter useful for the above mentioned purpose. Another object of the invention is well to disperse boron nitride in water. Another object is to provide a dispersion of boron nitride which will form a thin, uniform film of boron nitride on a mold surface of a glass forming mold. Another object is to prevent or to avoid the sticking of molded glass to the mold. Another object of the invention is to permit the use of molten glass at a higher temperature in automatic glass molding machinery.

Other objects will be in part obvious or in part pointed out hereinafter.

As conducive to a clearer understanding of the present invention, it is noted that when improved automatic modern machinery came to be used for making glassware there was found to be a problem involving the sticking of the glass to the mold. The most satisfactory mold lubricator, otherwise known as a mold release agent, otherwise known as an antisticking agent, appears to have been graphite dispersed in oil.

Boron nitride was also heretofore suggested as an antisticking agent in glass manufacture because it has much the same physical structure as graphite and is also refractory. Both graphite and boron nitride are platy materials and both are unctious. However no satisfactory way of coating the mold with boron nitride was found. Graphite in oil suffers the disadvantage that the glass being molded has to be at a relatively low temperature or the glass articles are found to be defective. This holds down the rate of production because with the molten glass at a higher temperature the machines can operate faster producing more articles per unit of time.

I have now discovered an excellent family of dispersing agents for boron nitride whereby a dispersion of boron nitride, BN, in water can be produced which can easily be used in or with glass making machinery to eliminate practically all sticking problems, to accelerate production, and to eliminate or reduce rejections for faulty manufacture. This family of dispersing agents consists of the acetates of acylated diamine essentially consisting of the acetate of acylated diamine having from 2 to 4 carbon atoms between the nitrogen atoms one amino group being tertiary having 2 alkyl radicals selected from the group consisting of methyl, ethyl, propyl and butyl and the other amino group being combined with the acyl group of a fatty acid containing an even number of carbon atoms from 12 to 18 inclusive. The preferred agent is selected from the group consisting of

and

and mixtures thereof. This preferred agent is one material, not a whole series of materials because the acetate radical will unite more or less indiscriminately with either of the amino groups so that some of the molecules will have the acetate radical on one amino group and other molecules will have it on the other amino group. Irrespective of which amino group has the acetate radical the compound has the same properties. It would be impractical to make one or the other compound as a mixture of both of them is bound to result from the reaction of acetic acid with the specified diamine or with any of the diamines within the group.

Dispersing the boron nitride in water with the dispersing agent is a very simple matter. Simply supply from 0.1% to 25% by weight of the boron nitride, mix 75% to 99.8% by weight of water with 0.1% to 5% by weight of the dispersing agent, add the boron nitride to the water containing the dispersing agent and stir.

To avoid selling the customer mostly water, the dispersion with close to 25% by weight of boron nitride can be sold and the customer can add more water. The actual material used by the glass manufacturer, however, will be nearer to the 0.1% of boron nitride and close to 99.8% of water. The dispersing agent is a very powerful dispersing agent and 0.1% thereof gives some results but preferably more, about 2%, is used. There is no advantage in using any more than 5% of the dispersing agent.

This composition of matter will readily coat glass making molds and give the advantages hereinbefore enumerated. It can be applied by hand, with a brush or with spray nozzles as desired. Whereas oil and graphite usually had to be applied to the molds before each molding operation, my composition needs to be applied only once every several hours, for example once a day for single shift operations. Furthermore the dispersing agent defined gives excellent results and makes mold coating an easy operation, whereas familiar wetting out and dispersing agents proved to be ineffective with boron nitride.

It will thus be seen that there has been provided by this invention a composition of matter in which the various objects hereinbefore set forth together with many thoroughly practical advantages are successfully achieved. As many possible embodiments may be made of the above invention, it is to be understood that all matter hereinbefore set forth is to be interpreted as illustrative and not in a limiting sense.

I claim:

1. A composition of matter essentially consisting of a dispersion of boron nitride from 0.1% to 25% by weight in from 75% to 99.8% of water by weight with from 0.1% to 5% by weight of a dispersing agent essentially consisting of the acetate of acylated diamine having from 2 to 4 carbon atoms between the nitrogen atoms, one amino group being tertiary and having 2 alkyl radicals selected from the group consisting of methyl, ethyl, propyl and butyl and the other amino group being combined with the acyl group of a fatty acid containing an even number of carbon atoms from 12 to 18 inclusive.

2. A composition according to claim 1 in which the diamine is a dialkyl ethylene diamine and the fatty acid is stearic acid.

3. A composition according to claim 2 in which the dispersing agent is selected from the group consisting of

and

and mixtures thereof.

References Cited in the file of this patent
UNITED STATES PATENTS

| | | |
|---|---|---|
| 2,201,041 | Katz | May 14, 1940 |
| 2,201,049 | Moore | May 14, 1940 |
| 2,618,032 | Traenkner | Nov. 12, 1952 |